United States Patent
Lu

(10) Patent No.: US 7,876,844 B2
(45) Date of Patent: Jan. 25, 2011

(54) APPARATUS AND METHOD FOR DETERMINING POSITIONS OF PILOT SUB-CARRIERS IN AN OFDM SYMBOL

(75) Inventor: JingHui Lu, Beijing (CN)

(73) Assignees: Vimicro Corporation, Beijing (CN); Wuxi Vimicro Corporation, Jiangsu (CN)

( * ) Notice: Subject to any disclaimer, the term of this patent is extended or adjusted under 35 U.S.C. 154(b) by 582 days.

(21) Appl. No.: 12/023,034

(22) Filed: Jan. 31, 2008

(65) Prior Publication Data

US 2008/0298485 A1 Dec. 4, 2008

(30) Foreign Application Priority Data

May 30, 2007 (CN) .................. 2007 1 0099791

(51) Int. Cl.
  *H04K 1/10* (2006.01)
  *H04L 27/28* (2006.01)
(52) U.S. Cl. .................................................. 375/260
(58) Field of Classification Search ................. 375/224, 375/259, 260, 261, 267, 284, 285, 295, 299, 375/316, 340, 343, 344, 346, 347, 350, 354, 375/362; 370/203, 206, 208, 209, 210, 281, 370/319, 330, 337, 342, 344, 480, 491, 503
See application file for complete search history.

(56) References Cited

U.S. PATENT DOCUMENTS

| 7,760,800 B2* | 7/2010 | Bae et al. ..................... 375/233 |
| 7,778,619 B2* | 8/2010 | Bultan et al. ................. 455/258 |
| 2004/0114551 A1* | 6/2004 | Gavillero Martin et al. . 370/324 |
| 2005/0213679 A1* | 9/2005 | Yamagata .................... 375/260 |
| 2008/0013573 A1* | 1/2008 | Guo et al. .................... 370/509 |
| 2008/0075212 A1* | 3/2008 | Chun et al. .................. 375/354 |

* cited by examiner

*Primary Examiner*—David C Payne
*Assistant Examiner*—Syed Haider
(74) *Attorney, Agent, or Firm*—Wuxi Sino IP Ltd.; Joe Zheng

(57) ABSTRACT

Techniques for determining positions of pilot sub-carriers in a received OFDM symbol are described. Components of pilot sub-carriers from a theoretical OFDM symbol are extracted to form M theoretical pilot sequences according to M possible distributions in frequency domain of the pilot sub-carriers in the theoretical OFDM symbol. Components of pilot sub-carriers from the received OFDM symbol are also extracted to form K hypothetical pilot sequences according to K possible distributions in frequency domain of pilot sub-carriers in the received OFDM symbol. The correlations of every two adjacent elements of the theoretical pilot sequences are calculated to get M corresponding theoretical correlation sequences, and the correlations of every two adjacent elements of the hypothetical pilot sequence are also calculated to get K corresponding hypothetical correlation sequences. Sequence correlations between the hypothetical correlation sequences and the theoretical correlation sequences are then calculated. The positions of pilot sub-carriers in the received OFDM symbol can be determined from the one that has the maximum modulus value.

19 Claims, 2 Drawing Sheets

● Pilot   ○ Data

APPARATUS AND METHOD FOR DETERMINING POSITIONS OF PILOT SUB-CARRIERS IN AN OFDM SYMBOL

BACKGROUND OF THE INVENTION

1. Field of the Invention

The present invention relates to the techniques for orthogonal frequency division multiplexing (OFDM), and more particularly to apparatus and method for determining positions of pilot sub-carriers in an OFDM symbol.

2. Description of Related Art

OFDM (orthogonal frequency division multiplexing) modulation techniques are widely used in communication areas such as 802.11, DAB, DVB, DSL communication protocol standards due to high channel efficiency and good antifading capability therein. In an OFDM communication system, to ensure orthogonality between sub-carriers is one of key factors to receive data exactly and requires frequency synchronization accurately. For receiving data exactly by a receiver, it also requires to perform a channel estimation based on pilots. Before the channel estimation can be performed, frame synchronization needs to be accomplished beforehand. All processes mentioned above need to determine positions of the pilot sub-carriers in an OFDM symbol first.

The OFDM communication system transmits data signals and pilot signal via a plurality of sub-carriers. The pilot sub-carriers are distributed periodically in time domain and in frequency domain and the pilot signal has special and known amplitude and phase. Therefore, frame synchronization and frequency synchronization can be accomplished by determining positions of the pilot sub-carriers in the OFDM symbol. It should be noted that fractional frequency offset estimation and correction are required to be accomplished beforehand in order to ensure orthogonality between the sub-carriers in the OFDM symbol, which is already introduced in many reference documents.

There are two conventional methods to determine positions of the pilot sub-carriers in the OFDM symbol. The first method is to determine positions of the pilot sub-carriers in one OFDM symbol period by utilizing the periodic distribution of the pilot sub-carriers in time and frequency domains and characteristics of energy of the pilot sub-carriers higher than that of data sub-carriers. The first method has one advantage of being short in time and one disadvantage of inaccuracy in seriously multipath fading and lower signal noise ratio conditions which may cause energy difference between the pilot sub-carriers and the data sub-carriers to be insignificant. The second method is to determine positions of the pilot sub-carriers by utilizing periodic distribution of the pilot sub-carriers in time and frequency domains and characteristics of correlation between the strong pilot signals being stronger and characteristics of correlation between the data signals being smaller. The second method may be referred to in a Chinese patent application No. CN200410092778.6, entitled "a method for integral frequency synchronization in OFDM", which is hereby incorporated by reference. Although the second method has higher resolution performance, it needs at least two OFDM symbol periods and is sensitive to errors caused by clock frequency offsets. The clock frequency offsets between clock frequencies of a receiver and a transmitter are often inevitable and may introduce different phase rotations at different frequencies, thereby decreasing or and even canceling the effect of coherent superposition in a special clock frequency offset so that the wrong decision may be made.

Thus, there is a need for improved techniques for determining positions of pilot sub-carriers in an OFDM symbol.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to techniques for determining positions of pilot sub-carriers in a received OFDM symbol. According to one aspect of the present invention, a method for determining positions of pilot sub-carriers in a received OFDM symbol comprising: extracting components of pilot sub-carriers from a theoretical OFDM symbol to form M theoretical pilot sequences $P_m$, m=1~M according to M possible distributions in frequency domain of pilot sub-carriers in the theoretical OFDM symbol; extracting components of pilot sub-carriers from the received OFDM symbol to form K hypothetical pilot sequences $R_k$, k=1~K according to K possible distributions in frequency domain of pilot sub-carriers in the received OFDM symbol; calculating correlation between every two adjacent elements of the theoretical pilot sequences $P_m$ to get M corresponding theoretical correlation sequences $CP_m$; calculating correlation between every two adjacent elements of the hypothetical pilot sequence $R_k$ to get K corresponding hypothetical correlation sequences $CR_k$; calculating sequence correlations $V_{m,k}$ between one of the hypothetical correlation sequences $CR_k$ and corresponding one of the theoretical correlation sequences $CP_m$ according to equation $V_{m,k}=\text{sum}(CR_k \cdot CP_m^*)$; and selecting one from all sequence correlations $V_{m,k}$ which has maximum modulus value, wherein the hypothetical pilot sequence corresponding to the selected sequence correlation is determined to be identical with the theoretical pilot sequence corresponding to the selected sequence correlation, thereby the positions of pilot sub-carriers in the received OFDM symbol can be determined.

The present invention may be implemented as an integrated circuit (e.g., modulator or demodulator), a method and a system (e.g., modulation or demodulation). According to one embodiment, the present invention is an apparatus for determining positions of pilot sub-carriers in a received OFDM symbol, the apparatus comprises: a sub-carriers extractor configured for extracting components of pilot sub-carriers from a theoretical OFDM symbol to form M theoretical pilot sequences $P_m$, m=1~M according to M possible distributions in frequency domain of pilot sub-carriers in the theoretical OFDM symbol, and extracting components of pilot sub-carriers from the received OFDM symbol to form K hypothetical pilot sequences $R_k$, k=1~K according to K possible distributions in frequency domain of pilot sub-carriers in the received OFDM symbol; a correlation calculator configured for calculating correlation between every two adjacent elements of the theoretical pilot sequences $P_m$ to get M corresponding theoretical correlation sequences $CP_m$, and calculating correlation between every two adjacent elements of the hypothetical pilot sequence $R_k$ to get K corresponding hypothetical correlation sequences $CR_k$; a grouping correlation accumulator configured for calculating sequence correlations $V_{m,k}$ between one of the hypothetical correlation sequences $CR_k$ and corresponding one of the theoretical correlation sequences $CP_m$ according to equation $V_{m,k}=\text{sum}(CR_k \cdot CP_m^*)$; a comparator configured for selecting one from all sequence correlations $V_{m,k}$ which has maximum modulus value, wherein the hypothetical pilot sequence corresponding to the selected sequence correlation is determined to be identical with the theoretical pilot sequence corresponding to the selected sequence correlation, thereby the positions of pilot sub-carriers in the received OFDM symbol can be determined.

One of the features, benefits and advantages in the present invention is to provide techniques for trimming a current source to a predefined precision without requiring an addition connection.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
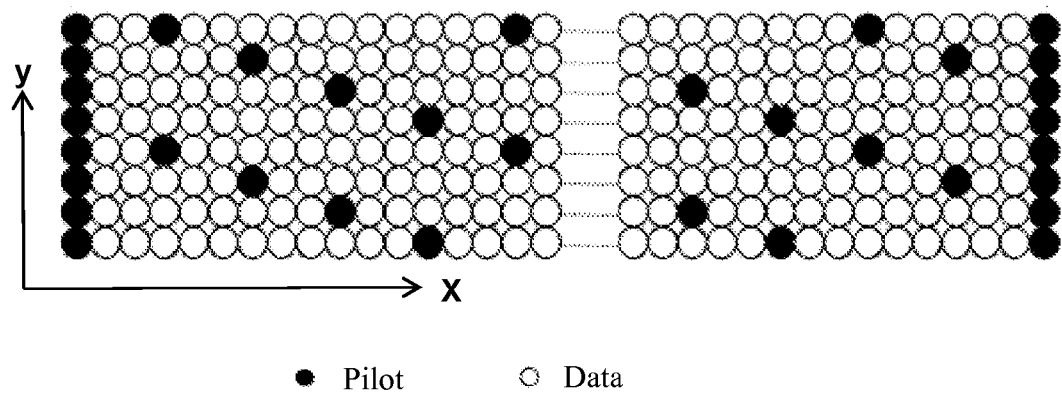
FIG. 1 is a schematic view showing a distribution of pilot sub-carriers in OFDM symbols.
Figure 2:
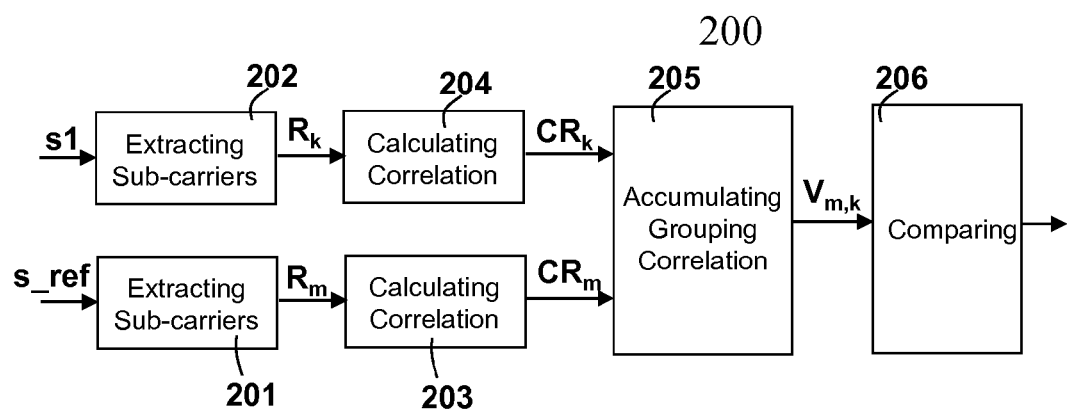
FIG. 2 is a schematic flow chart showing a method for determining positions of pilot sub-carriers in an OFDM symbol according to one embodiment of the present invention.
Figure 3:
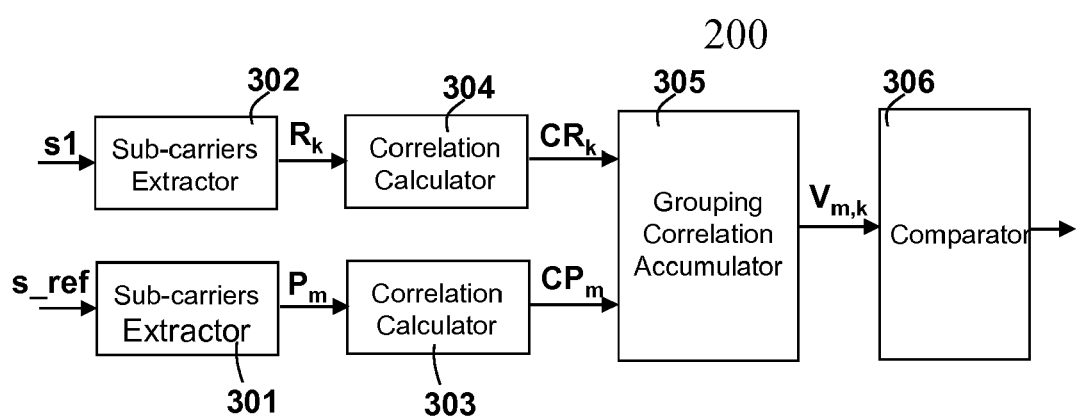
FIG. 3 is a schematic block diagram showing an apparatus for determining positions of pilot sub-carriers in the OFDM symbol according to one embodiment of the present invention.

Embodiments of the present invention are discussed herein with reference to FIGS. 1-3. However, those skilled in the art will readily appreciate that the detailed description given herein with respect to these figures is for explanatory purposes only as the invention extends beyond these limited embodiments.

According to one aspect of the present invention, a set of pilot signals in equal interval are inserted into an OFDM symbol and all or part of pilot signals in one common OFDM symbol forms a pilot sequence. Pilot sequences of continuous OFDM symbols are distributed according to a given period. For example, one pilot signal is set every N sub-carriers in the common OFDM symbol, and the pilot sequences of the adjacent OFDM symbols are staggered in equal interval, thereby M OFDM symbols form one distribution period of the pilot sequence. FIG. 1 is a schematic diagram showing a distribution of pilot sub-carriers in OFDM symbols, wherein the X-axis is a frequency direction and the Y-axis is a time direction. It can be observed that the pilot sub-carriers are distributed periodically in the frequency and time domains with an interval period in frequency domain, namely N is 12 and an interval period in time domain namely M is 4.

According to one embodiment of the present invention, based on the distribution of pilot sub-carriers in the OFDM symbols shown in FIG. 1, it is assumed that a fractional frequency offset of a received OFDM symbol s1 has already been compensated and an integral frequency offset of the received OFDM symbol s1 is undetermined. FIG. 2 is a schematic flowchart or process 200 of determining positions of pilot sub-carriers in the OFDM symbol according to one embodiment of the present invention. FIG. 3 is a schematic block diagram 300 showing an apparatus for determining positions of pilot sub-carriers in the OFDM symbol according to one embodiment of the present invention.

There are M possible distributions in frequency domain for the pilot sub-carries of a theoretical OFDM symbol s_ref, wherein M=4. At 201, a sub-carries extractor 301 is provided for extracting M theoretical pilot sequences $P_m$, m=1~M from the theoretical OFMD symbol s_ref, wherein the length of each theoretical pilot sequence is L which is equal to or less than a total number of the pilot signals in one theoretical OFDM symbol.

It is assumed that the integral frequency offset of the received OFDM symbol s1 is from k1 to k2. There are K possible distributions in the frequency domain for pilot sub-carries of the received OFDM symbol s1, wherein K=|k2−k1+1|. At 202, a sub-carries extractor 302 is provided for extracting K hypothetical pilot sequences $R_k$, k=1~K from the OFMD symbol s1, wherein the length of each hypothetical pilot sequence is L.

At 203, a correlation calculator 303 is provided for calculating the correlation of every two adjacent elements of the M theoretical pilot sequences $P_m$ to get M corresponding theoretical correlation sequences $CP_m$, wherein the length of each theoretical hypothetical correlation sequence $CP_m$ is L−1.

At 204, a correlation calculator 304 is provided for calculating the correlation of every two adjacent elements of the K hypothetical pilot sequences $R_k$ to get K corresponding hypothetical correlation sequences $CR_k$, wherein the length of each hypothetical correlation sequence $CR_k$ is L−1.

At 205, a grouping correlation accumulator 305 is provided for calculating sequence correlation $V_{m,k}$ between one of the hypothetical correlation sequences $CR_k$ and corresponding one of theoretical correlation sequences $CP_m$ according to equation $V_{m,k}=\text{sum}(CR_k \cdot CP_m^*), \forall(m,k)$. It should be noted that any one of the hypothetical correlation sequences $CR_k$ can correspond to any one of theoretical correlation sequences $CP_m$ in the first embodiment. Therefore, there are C sequence correlations $V_{m,k}$ in all, C=M*K.

At 206, a comparator 306 is provided for selecting one sequence correlation from the C sequence correlations $V_{m,k}$ which has maximum modulus value. It can conclude that the hypothetical pilot sequence corresponding to the selected sequence correlation is identical with the theoretical pilot sequence corresponding to the selected sequence correlation. As a result, the positions of pilot sub-carriers in the received OFDM symbol can be determined.

Thus, the method according to the embodiment of the present invention can determine positions of the pilot sub-carriers in one OFDM period by utilizing correlation of two adjacent pilot signals, thereby shortening the determining time. It is substantially immune to the clock frequency offset, thereby increasing the accuracy at the same time.

According to another embodiment, the processes 201 to 205 may be performed repeatedly for more than one received OFDM symbols according to the periodic distribution of the pilot sub-carriers, to cause the common sequence correlation $V_{m,k}$ are added together. Finally, the process 206 is performed.

Further, in one embodiment, based on the distribution of pilot sub-carriers in the OFDM symbols shown in FIG. 1, it is assumed that the fractional frequency offset of the received OFDM symbol s1 has been compensated and the integral frequency offset of the received OFDM symbol s1 is determined. There are M possible distributions in frequency domain for pilot sub-carriers of the theoretical OFDM symbol s_ref, wherein M=4. At 201, the sub-carriers extractor 301 is provided for extracting M theoretical pilot sequences $P_m$, m=1~M from the theoretical OFMD symbol s_ref, wherein the length of each theoretical pilot sequence is L which is equal to or less than total number of the pilot signals in one theoretical OFDM symbol.

There are K possible distributions in frequency domain for pilot sub-carriers of the received OFDM symbol s1, wherein K=M. At 202, the sub-carriers extractor 302 is provided for extracting K hypothetical pilot sequences $R_k$,k=1~K from the OFMD symbol s1, wherein the length of each hypothetical pilot sequence is L.

At 203, the correlation calculator 303 is provided for calculating correlation between every two adjacent elements of the theoretical pilot sequences $P_m$ to get M theoretical correlation sequences $CP_m$, wherein the length of each theoretical hypothetical correlation sequence $CP_m$ is L−1.

At 204, the correlation calculator 304 is provided for calculating correlation between every two adjacent elements of the hypothetical pilot sequences $R_k$ to get K hypothetical correlation sequences $CR_k$, wherein the length of each hypothetical correlation sequence $CR_k$ is L−1.

At 205, the grouping correlation accumulator 305 is provided for calculating sequence correlation $V_{m,k}$ between one of the hypothetical correlation sequences $CR_k$ and corresponding one of theoretical correlation sequences $CP_m$ according to equation $V_{m,k}=sum(CR_k \cdot CP_m^*), \forall (m=k)$. It should be noted that one of the hypothetical correlation sequences $CR_k$ only can correspond to one of theoretical correlation sequences $CP_m$ in the second embodiment. Therefore, there are C sequence correlations $V_{m,k}$ in all, C=M.

At 206, the comparator 306 is provided for selecting one sequence correlation from the C sequence correlations $V_{m,k}$ which has maximum modulus value. It can conclude that the hypothetical pilot sequence corresponding to the selected sequence correlation is identical with the theoretical pilot sequence corresponding to the selected sequence correlation. As a result, the positions of pilot sub-carriers in the received OFDM symbol can be determined.

According to one embodiment, the sub-carriers extractor 301 and 302 comprises a storage unit for storing the extracted pilot sequences $R_k$ and $P_m$. The grouping correlation accumulator 305 comprises an adder and a multiplier.

Thus, the positions of the pilot sub-carriers in one OFDM period may be determined by utilizing correlation of two adjacent pilot signals, thereby shortening the determining time. It is substantially immune to the clock frequency offset, thereby increasing accuracy at the same time.

Similarly, in a further embodiment, the processes 201 to 205 may be performed repeatedly for more than one received OFDM symbols according to the periodic distribution of the pilot sub-carriers, results as to common sequence correlation $V_{m,k}$ are added together. Finally, the process 206 is performed.

An example is given here to facilitate the further understanding of the present invention. It is assumed M=4, provided that k1=−2, k2=2, so K=5. After the processes 201 to 205 are performed for one received OFDM symbol, 20 sequence correlations $V'_{m,k}$ are obtained. Provided that $V''_{1,1}$ corresponds to the pilot sub-carriers distributed as a first line of the OFDM symbol shown in FIG. 1 and the integral frequency offset is −2. After the processes 201 to 205 are performed again for next received OFDM symbol, another 20 sequence correlations $V''_{m,k}$ are obtained. One of the 20 sequence correlations $V''_{m,k}$ which corresponds to the pilot sub-carries is distributed as a second line of the OFDM symbol shown in FIG. 1 and the integral frequency offset is −2 is regarded as the common sequence correlation of $V'_{1,1}$ and denoted as $V''_{1,1}$. Therefore, the results of the common sequence correlation $V_{m,k}$ are added together means $V_{m,k}=V'_{m,k}+V''_{m,k}$. Finally, the process 206 is performed. It is readily appreciated by the ordinary people skilled in the art that the given example can also be for more than two OFDM symbols situation.

The present invention can also be applied on an OFDM demodulator to determine positions of pilot sub-carriers in the OFDM symbol. The operation of determining the pilot sub-carriers in the OFDM symbol is substantially similar, the description thereof is not to be repeated to avoid obscuring aspect of the present invention.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for determining positions of pilot sub-carriers in a received OFDM symbol, the method comprising:

extracting components of pilot sub-carriers from a theoretical OFDM symbol to form M theoretical pilot sequences $P_m$,m=1~M according to M possible distributions in frequency domain of pilot sub-carriers in the theoretical OFDM symbol;

extracting components of pilot sub-carriers from the received OFDM symbol to form K hypothetical pilot sequences $R_k$,k=1~K according to K possible distributions in frequency domain of pilot sub-carriers in the received OFDM symbol;

calculating correlation between every two adjacent elements of the theoretical pilot sequences $P_m$ to get M corresponding theoretical correlation sequences $CP_m$;

calculating correlation between every two adjacent elements of the hypothetical pilot sequence $R_k$ to get K corresponding hypothetical correlation sequences $CR_k$;

calculating sequence correlations $V_{m,k}$ between one of the hypothetical correlation sequences $CR_k$ and corresponding one of the theoretical correlation sequences $CP_m$ according to equation $V_{m,k}=sum(CR_k \cdot CP_m^*)$; and selecting one from all sequence correlations $V_{m,k}$ which has maximum modulus value, wherein the hypothetical pilot sequence corresponding to the selected sequence correlation is determined to be identical with the theoretical pilot sequence corresponding to the selected sequence correlation, thereby the positions of pilot sub-carriers in the received OFDM symbol can be determined.

2. The method according to claim 1, wherein any one of the hypothetical correlation sequences $CR_k$ can correspond to any one of theoretical correlation sequences $CP_m$, and there are C sequence correlations $V_{m,k}$ in all, C=M*K.

3. The method according to claim 1, wherein one of the hypothetical correlation sequences $CR_k$ only can correspond to one of theoretical correlation sequences $CP_m$ and there are C sequence correlations $V_{m,k}$ in all, C=M.

4. The method according to claim 1, wherein the length of each theoretical pilot sequence is L which is equal to or less than total number of pilot signals in one theoretical OFDM symbol, the length of each hypothetical pilot sequence is L which is equal to or less than total number of pilot signals in one theoretical OFDM symbol, the length of each theoretical correlation sequence is L−1 and the length of each hypothetical correlation sequence is L−1.

5. The method according to claim 1, wherein provided that a fractional frequency offset of the received OFDM symbol is compensated and an integral frequency offset of the received OFDM symbol is undetermined, and wherein M=4.

6. The method according to claim 5, wherein provided that the integral frequency offset of the received OFDM symbol is from k1 to k2, and wherein K=|k2−k1+1|.

7. The method according to claim 1, wherein provided that a fractional frequency offset of the received OFDM symbol is compensated and an integral frequency offset of the received OFDM symbol is determined, and wherein M=4, K=M.

8. The method according to claim 1, wherein the former five processes can be performed repeatedly for more than one received OFDM symbol, results as to common sequence correlation $V_{m,k}$ are added together, the last process is performed finally.

9. An apparatus for determining positions of pilot sub-carriers in a received OFDM symbol, the apparatus comprising:
a sub-carriers extractor configured for extracting components of pilot sub-carriers from a theoretical OFDM symbol to form M theoretical pilot sequences $P_m$, m=1~M according to M possible distributions in frequency domain of pilot sub-carriers in the theoretical OFDM symbol, and extracting components of pilot sub-carriers from the received OFDM symbol to form K hypothetical pilot sequences $R_k$, k=1~K according to K possible distributions in frequency domain of pilot sub-carries in the received OFDM symbol;
a correlation calculator configured for calculating correlation between every two adjacent elements of the theoretical pilot sequences $P_m$ to get M corresponding theoretical correlation sequences $CP_m$, and calculating correlation between every two adjacent elements of the hypothetical pilot sequence $R_k$ to get K corresponding hypothetical correlation sequences $CR_k$;
a grouping correlation accumulator configured for calculating sequence correlations $V_{m,k}$ between one of the hypothetical correlation sequences $CR_k$ and corresponding one of the theoretical correlation sequences $CP_m$ according to equation $V_{m,k}=\text{sum}(CR_k \cdot CP_m^*)$;
a comparator configured for selecting one from all sequence correlations $V_{m,k}$ which has maximum modulus value, wherein the hypothetical pilot sequence corresponding to the selected sequence correlation is determined to be identical with the theoretical pilot sequence corresponding to the selected sequence correlation, thereby the positions of pilot sub-carriers in the received OFDM symbol can be determined.

10. The apparatus according to claim 9, wherein any one of the hypothetical correlation sequences $CR_k$ can correspond to any one of theoretical correlation sequences $CP_m$, and there are C sequence correlations $V_{m,k}$ in all, C=M*K.

11. The apparatus according to claim 9, wherein one of the hypothetical correlation sequences $CR_k$ only can correspond to one of theoretical correlation sequences $CP_m$ and there are C sequence correlations $V_{m,k}$ in all, C=M.

12. The apparatus according to claim 9, wherein the length of each theoretical pilot sequence is L which is equal to or less than total number of pilot signals in one theoretical OFDM symbol, the length of each hypothetical pilot sequence is L which is equal to or less than total number of pilot signals in one theoretical OFDM symbol, the length of each theoretical correlation sequence is L−1 and the length of each hypothetical correlation sequence is L−1.

13. The apparatus according to claim 9, wherein provided that a fractional frequency offset of the received OFDM symbol is compensated and an integral frequency offset of the received OFDM symbol is undetermined, and wherein M=4.

14. The apparatus according to claim 13, wherein provided that the integral frequency offset of the received OFDM symbol is from k1 to k2, and wherein K=|k2−k1+1|.

15. The apparatus according to claim 9, wherein provided that a fractional frequency offset of the received OFDM symbol is compensated and an integral frequency offset of the received OFDM symbol is determined, and wherein M=4, K=M.

16. The apparatus according to claim 9, wherein the sub-carries extractor comprises a storage unit for storing the extracted pilot sequences $R_k$ and $P_m$.

17. The apparatus according to claim 9, wherein the grouping correlation accumulator comprises an adder and a multiplier.

18. The apparatus according to claim 9, wherein the apparatus is implemented in an OFDM modulator.

19. The apparatus according to claim 9, wherein the apparatus is implemented in an OFDM demodulator.

* * * * *